April 8, 1969

T. H. MAIMAN 3,437,942

METHOD AND APPARATUS FOR INCREASING THE RADIANCE OF LASERS

Filed Dec. 7, 1966

INVENTOR.
THEODORE H. MAIMAN
BY
*Elliott & Pastoriza*
ATTORNEYS

United States Patent Office 3,437,942
Patented Apr. 8, 1969

3,437,942
METHOD AND APPARATUS FOR INCREASING THE RADIANCE OF LASERS
Theodore H. Maiman, Pacific Palisades, Calif., assignor to Union Carbide Corporation, a corporation of New York
Continuation-in-part of application Ser. No. 503,461, Oct. 23, 1965. This application Dec. 7, 1966, Ser. No. 607,345
Int. Cl. H01s 3/02
U.S. Cl. 330—4.3
4 Claims

ABSTRACT OF THE DISCLOSURE

The brightness or radiance of a laser beam is increased by using a small diameter laser rod for providing a beam having a small angle of divergence and passing this beam through a beam expander. The output from the beam expander is then passed through a large diameter light amplifier to restore or even surpass the initial power density. The beam divergence is not appreciably affected in the light amplifier since the light will only make one pass through the amplifier. Beam divergence resulting from imperfections in the laser rod and amplifier can also be reduced by adjusting the optics in the beam expander.

---

This application is a continuation-in-part of my copending application Ser. No. 503,461, filed Oct. 23, 1965, and now abandoned.

One of the most important parameters in characterizing the effectiveness or figure of merit of a laser system is the radiance of the laser beam. The radiance is defined as the power per unit area per unit solid angle radiated from the laser.

It will be evident that the radiance of a laser may be increased by simply increasing the power. As a practical matter, however, it is found that if the power for a particular laser material is increased beyond a certain limit, damage to the material itself occurs. In fact, repeated operation at such high power can result in complete destruction of a laser crystal.

It is found that the damage to the laser material appears to be related to the power density; that is, the power per unit area in the laser beam. Therefore, as a practical approach to increasing the radiance or maximum brightness, the beam angle itself may be reduced. However, improved beam angles are difficult to realize in relatively large diameter laser rods as compared to smaller diameter rods, principally because it is easier to fabricate a small diameter rod with high quality.

In addition, imperfections or "lens" effects in the laser rod itself or in associated optics such as an optical amplifier rod can affect the finite beam divergence.

With the foregoing considerations in mind, it is a primary object of the present invention to provide a novel method and apparatus for increasing the radiance of a laser beam.

More particularly, it is an object to provide a method and apparatus for increasing the radiance of a laser beam wherein the resultant beam is of a given cross-sectional area considerably larger than can be obtained from small diameter laser oscillators.

Another object is to provide a method and apparatus for at least partially correcting and/or compensating for beam divergence or convergence as a result of imperfections and "lens" effects in the laser crystal itself and associated optics.

Briefly, these and other objects and advantages of this invention are realized by employing, in addition to a laser oscillator for providing initial radiation, a laser rod functioning as an amplifier. When functioning as an amplifier, the beam angle performance of the resulting radiation is far superior to that when functioning as an oscillator. This result is a consequence of the fact that the laser light goes through multiple passes in an oscillator rod but only a single pass in an amplifier.

Advantage is taken of the foregoing by combining the small beam angle feature more easily attained in small diameter rods with a large diameter amplifier. Thus, in accordance with the method and apparatus, a small diameter rod is used as an oscillator to develop a relatively small beam angle. The beam is then put through a beam expander resulting in a still smaller beam angle. However, the output from the beam expander suffers in power density so that there is no increase in brightness of the beam at this stage. However, by now employing a large diameter amplifier rod for receiving the expanded beam from the beam expander, the power density of the expanded beam may be increased to correspond substantially to that of the initial beam from the small diameter oscillator or even higher if the oscillator is not operating at its power limit. Since the beam angle is not appreciably increased by the large diameter amplifier rod, there results a beam having a small beam angle with the same or greater power density as provided in the output beam from a small diameter rod, thus resulting in a beam of higher radiance or brightness. By this arrangement, it is not necessary to operate the oscillator near its power limit, thereby decreasing the risk of damaging the oscillator rod.

Further, by making suitable adjustments in the beam expander optics, at least partial correction or compensation for imperfections and "lens" effects in the oscillator rod and amplifier rod can be realized.

An inherent advantage in the foregoing system is a decrease in the risk of damage to the amplifier rod. In this respect, most laser output beams are characterized by non-uniformities referred to in the art as "hot spots." When such a beam is passed through a beam expander, these "hot spots" are spread out by the action of the beam expander with the result that the power density in these spots is less and thus the tendency of "hot spot" damage to the amplifier is less.

A better understanding of the invention will be had by referring to the accompanying drawings, in which.

Figure 1:
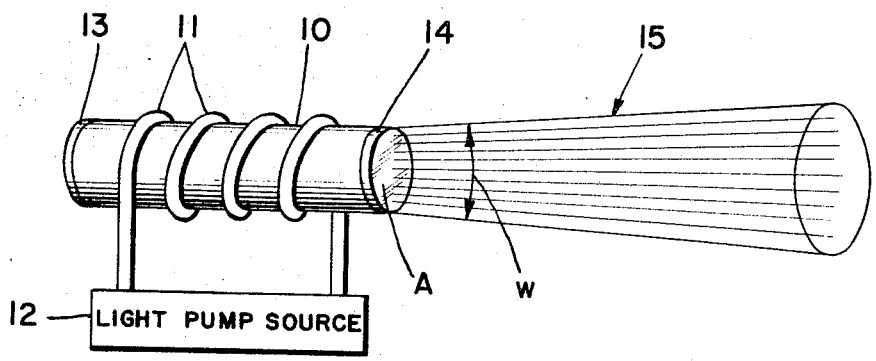
FIGURE 1 is a schematic perspective view of a laser system.

Referring first to FIGURE 1, there is shown, merely as one example of a laser system, a laser oscillator including a laser rod 10 surrounded by a spiral flash lamp 11 powered from a suitable source 12. The rod 10 includes suitable dielectric end coatings as indicated at 13 and 14. End coating 13 is substantially 100 percent reflecting and the end coating 14 is only partially reflecting and partially transmitting to pass the laser output beam indicated at 15.

As shown in FIGURE 1, the beam cross-sectional area at its exit point is designated A and the solid angle into which the beam radiates determines the beam angle or divergence of the beam and is indicated at W. The radiance of the beam or its brightness R is defined as the power per unit area divided by the angle W. Thus, letting P equal the power of the beam at the cross-sectional area A, the radiance R is given by:

$$R = (P/A)/W$$

As described heretofore, smaller diameter laser rods are more easily fabricated with high quality to provide a small beam angle and thus normally may be made to have a greater radiance than larger diameter laser rods. However, as also described heretofore, since increasing the power density beyond certain limits can seriously impair or damage the laser oscillator, the only practical means of improving the radiance is to decrease the beam angle.

In accordance with the method and apparatus of the present invention, a large diameter laser rod is employed as an amplifier in conjunction with a beam expander to provide a resultant laser beam having a greatly increased radiance over that obtainable with a large diameter rod used only as an oscillator itself.

Figure 2:
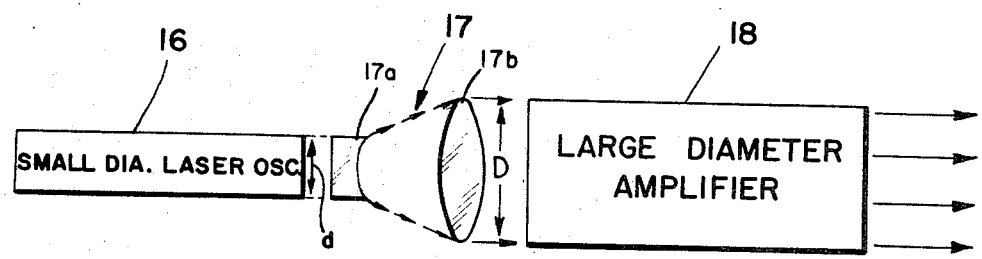
FIGURE 2 is a block diagram of the various components enabling the radiance of a beam from a system such as illustrated in FIGURE 1 to be considerably improved; and, FIGURE 3 is a diagram of path directions of laser light showing various beam angles useful in explaining the operation of the apparatus of FIGURE 2.

The foregoing is achieved as illustrated in FIGURE 2 by providing a small diameter laser oscillator rod 16 which may take the form shown in FIGURE 1 and passing the output beam into a beam expander 17. The expander 17 may include a small divergent lens 17a and large convergent lens 17b with their respective foci substantially coincident at the left of the lens 17a. Alternatively, the lens 17a could be convergent and further spaced from the lens 17b such that their respective foci lie between the lenses and are substantially coincident. The beam angle is reduced considerably in the beam expander, the ratio of the beam angle passing into the beam expander to the beam angle of the output beam approaching $D/d$ where D is the diameter of the output beam from the expander and $d$ is the diameter of the beam from the oscillator.

A large diameter laser rod employed as an amplifier and indicated at 18 is positioned to receive the output from the beam expander 17. There is not any further appreciable divergence of the beam as a consequence of the large diameter amplifier since the beam need only traverse the rod once. However, the amplifier does increase the power density of the beam as desired and preferably up to or greater than the value corresponding to its original power density from the smaller diameter laser oscillator 16. In this respect, if the laser oscillator 16 is operating at its power limit, the gain of the amplifier is made equal to $(D/d)^2$ to bring the power density back to its original value. If the oscillator is operating under its power limit, which might be desirable for longlife operation, the gain of the amplifier is made greater than $(D/d)^2$.

Figure 3:
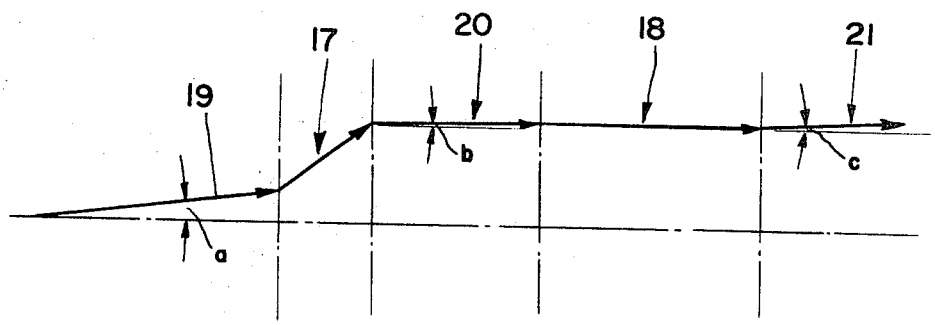

FIGURE 3 illustrates in diagrammatic form the various angles involved. Thus, for the beam 19 from the small diameter oscillator, the beam angle is shown at $a$. This angle is reduced considerably for the beam 20 as indicated at $b$ after leaving the beam expander 17. The beam angle $b$ in turn is not appreciably increased for the final output beam 21 after passing through the large diameter amplifier 18 is indicated at $c$. Since the beam angle of the output beam 21 from the amplifier 18 is considerably reduced over the beam angle of the beam 19 from the smaller diameter laser oscillator, and the power density is at least equal to or greater than the power density from the oscillator, the radiance is correspondingly increased.

In addition, it is found that by changing the spacing between the lenses 17a and 17b of the beam expander so as to separate their respective foci, correction or compensation for some beam divergence resulting from imperfections in the oscillator rod itself or resulting from optical flaws in the amplifier, can be realized. In this respect, the foci would normally be superimposed as described if the oscillator and amplifier optics were perfect. Since such is not always the case in practice, the output beam divergence from the amplifier can often be made smaller by empirically setting the separation of the lens in the expander to separate the respective foci in a manner to reduce further the beam divergence. As much as a two-to-one improvement in beam divergence reduction has been achieved by such purposeful separation.

The foregoing method and means for providing an improved laser beam of greatly increased radiance is not limited to any special materials and is applicable to pulsed as well as continuous wave laser systems.

What is claimed is:

1. A method of increasing the radiance of a laser system comprising the steps of: providing a relatively small diameter laser oscillator of relatively small beam angle; expanding the diameter of a beam of radiation from said laser oscillator; and providing a laser amplifier of relatively large diameter for amplifying the expanded beam to provide a power density equal to or greater than the original power density of said beam whereby there results a beam from said amplifier of smaller beam angle than said original beam to provide an increased radiance.

2. The method according to claim 1, including the step of varying the relative positions of the optics employed in the step of expanding the diameter of said beam to at least partially correct and compensate for beam divergence resulting from imperfections in said laser oscillator and laser amplifier.

3. A laser system of high radiance including: a relatively small diameter laser oscillator rod for providing a beam of radiation having a given diameter, power density, and relatively small solid beam angle as compared to larger diameter rods; a beam expander positioned to receive said beam of radiation and provide an expanded beam having a diameter larger than said given diameter; and a laser amplifier rod of diameter larger than said given dimeter positioned to receive said expanded beam and increase its power density to a value such that the ratio of said increased power density to the solid beam angle of radiation passing from said laser amplifier rod is greater than the ratio of said given power density to said given solid beam angle.

4. An apparatus according to claim 3, in which said beam expander includes at least one small diameter lens and one large diameter lens, the separation between the respective foci of the lenses being changeable from a zero separation when said foci are coincident to a finite separation so that said beam expander can, at least partially, correct and compensate for beam divergence resulting from imperfections in the optics of said laser oscillator and laser amplifier.

References Cited

UNITED STATES PATENTS 3,312,905   4/1967   Lewis _____ 330—4.3

ROY LAKE, *Primary Examiner.*

DARWIN R. HOSTETTER, *Assistant Examiner.*

U.S. Cl. X.R.

330—53; 331—94.5